(12) United States Patent
Hawkins et al.

(10) Patent No.: US 7,778,747 B2
(45) Date of Patent: Aug. 17, 2010

(54) ADHESION CONTROL SYSTEM FOR OFF-HIGHWAY VEHICLE

(75) Inventors: William Charles Hawkins, Mt. Vernon, IL (US); Sean James McManus, Calgary (CA)

(73) Assignee: National Railway Equipment Co., Mt. Vernon, IL (US)

( * ) Notice: Subject to any disclaimer, the term of this patent is extended or adjusted under 35 U.S.C. 154(b) by 958 days.

(21) Appl. No.: 11/469,299

(22) Filed: Aug. 31, 2006

(65) Prior Publication Data

US 2008/0059112 A1    Mar. 6, 2008

(51) Int. Cl.
    B60L 15/20    (2006.01)
(52) U.S. Cl. .................. 701/22; 701/19; 701/82
(58) Field of Classification Search .......... 701/19, 701/22, 82
    See application file for complete search history.

(56) References Cited

U.S. PATENT DOCUMENTS

| | | | |
|---|---|---|---|
| 2,328,994 A | 9/1943 | Ogden | |
| 2,361,200 A | 10/1944 | Hibbard | |
| 2,371,832 A | 3/1945 | Lillquist | |
| 2,716,209 A | 8/1955 | Secarea et al. | |
| 2,806,149 A | 9/1957 | Lillquist | |
| 3,117,264 A | 1/1964 | Smith | |
| 3,296,510 A | 1/1967 | Stamm | |
| 3,728,596 A | 4/1973 | Hermansson et al. | |
| 3,790,871 A | 2/1974 | Smith | |
| 3,898,937 A | 8/1975 | Johnson | |
| 3,930,189 A | 12/1975 | Smith | |
| 3,967,862 A * | 7/1976 | Hunter et al. | 303/150 |
| 3,982,164 A | 9/1976 | de Buhr et al. | |
| 3,997,822 A | 12/1976 | Logston, Jr. et al. | |
| 4,035,698 A | 7/1977 | Soderberg | |
| 4,072,206 A * | 2/1978 | Larson et al. | 180/277 |
| 4,134,048 A | 1/1979 | Schneider | |
| 4,136,303 A | 1/1979 | Almquist et al. | |
| 4,161,717 A | 7/1979 | Hoover et al. | |
| 4,298,940 A | 11/1981 | Tadokoro et al. | |
| 4,309,971 A * | 1/1982 | Chiesa et al. | 123/480 |
| 4,347,569 A | 8/1982 | Allen, Jr. et al. | |
| 4,457,237 A | 7/1984 | Theurer et al. | |
| 4,463,289 A | 7/1984 | Young | |
| 4,471,276 A | 9/1984 | Cudlitz | |
| 4,495,449 A | 1/1985 | Black et al. | |
| 4,588,932 A | 5/1986 | Riondel | |
| 4,701,682 A | 10/1987 | Hirotsu et al. | |
| 4,801,855 A | 1/1989 | Nohmi et al. | |
| 4,896,090 A | 1/1990 | Balch et al. | |
| 4,924,395 A | 5/1990 | Evans et al. | |
| 4,936,610 A | 6/1990 | Kumar et al. | |
| 4,944,539 A | 7/1990 | Kumar et al. | |
| 4,950,964 A | 8/1990 | Evans | |
| 5,070,283 A | 12/1991 | Avitan | |
| 5,289,093 A | 2/1994 | Jobard | |

(Continued)

*Primary Examiner*—Mark Hellner
*Assistant Examiner*—Ari M Diacou
(74) *Attorney, Agent, or Firm*—Senniger Powers LLP

(57) ABSTRACT

A system and method for controlling adhesion of a wheel of an off-highway vehicle to a surface supporting the wheel measures a parameter of a traction motor of the off-highway vehicle driving the wheel. The parameter is analyzed to determine if wheel slip is present and the severity of the wheel slip. Some embodiments of the invention include adjusting a duty cycle of the traction motor as a function of the severity of the detected wheel slip.

20 Claims, 8 Drawing Sheets

U.S. PATENT DOCUMENTS

| | | | |
|---|---|---|---|
| 5,349,279 A | 9/1994 | Avitan | |
| 5,436,538 A | 7/1995 | Garvey et al. | |
| 5,453,672 A | 9/1995 | Avitan | |
| 5,585,706 A | 12/1996 | Avitan | |
| 5,610,819 A | 3/1997 | Mann et al. | |
| 5,661,378 A | 8/1997 | Hapeman | |
| 5,910,714 A * | 6/1999 | Buchanan et al. | 318/139 |
| 6,012,011 A | 1/2000 | Johnson | |
| 6,020,714 A | 2/2000 | Ehrler et al. | |
| 6,028,402 A | 2/2000 | Kumar et al. | |
| 6,104,148 A | 8/2000 | Kumar et al. | |
| 6,166,512 A | 12/2000 | Kojima | |
| 6,208,097 B1 | 3/2001 | Reddy et al. | |
| 6,411,051 B1 | 6/2002 | Liu | |
| 6,588,528 B2 * | 7/2003 | Ligman | 180/206 |
| 6,611,116 B2 | 8/2003 | Bachman et al. | |
| 6,634,303 B1 | 10/2003 | Madsen et al. | |
| 6,636,798 B2 | 10/2003 | Biess et al. | |
| 6,650,993 B2 | 11/2003 | Wolf et al. | |
| 6,812,656 B2 | 11/2004 | Donnelly et al. | |
| 6,813,583 B2 | 11/2004 | Kumar et al. | |
| 7,027,900 B2 * | 4/2006 | Kumar et al. | 701/19 |
| 7,204,222 B2 | 4/2007 | Yamauchi et al. | |
| 7,304,445 B2 | 12/2007 | Donnelly | |
| 7,309,929 B2 | 12/2007 | Donnelly et al. | |
| 7,448,328 B2 * | 11/2008 | Kumar | 105/35 |
| 7,679,298 B2 * | 3/2010 | Kumar | 318/66 |
| 2002/0033157 A1 | 3/2002 | Thompson et al. | |
| 2003/0024750 A1 * | 2/2003 | Ligman | 180/65.3 |
| 2003/0029406 A1 | 2/2003 | Weiss | |
| 2004/0262995 A1 | 12/2004 | Hawkins | |
| 2005/0024001 A1 | 2/2005 | Donnelly et al. | |
| 2005/0045058 A1 | 3/2005 | Donnelly et al. | |
| 2005/0065701 A1 * | 3/2005 | Kumar et al. | 701/82 |
| 2005/0189886 A1 | 9/2005 | Donnelly et al. | |
| 2005/0189887 A1 | 9/2005 | Donnelly et al. | |
| 2005/0206230 A1 | 9/2005 | Donnelly | |
| 2005/0264245 A1 | 12/2005 | Donnelly | |

* cited by examiner

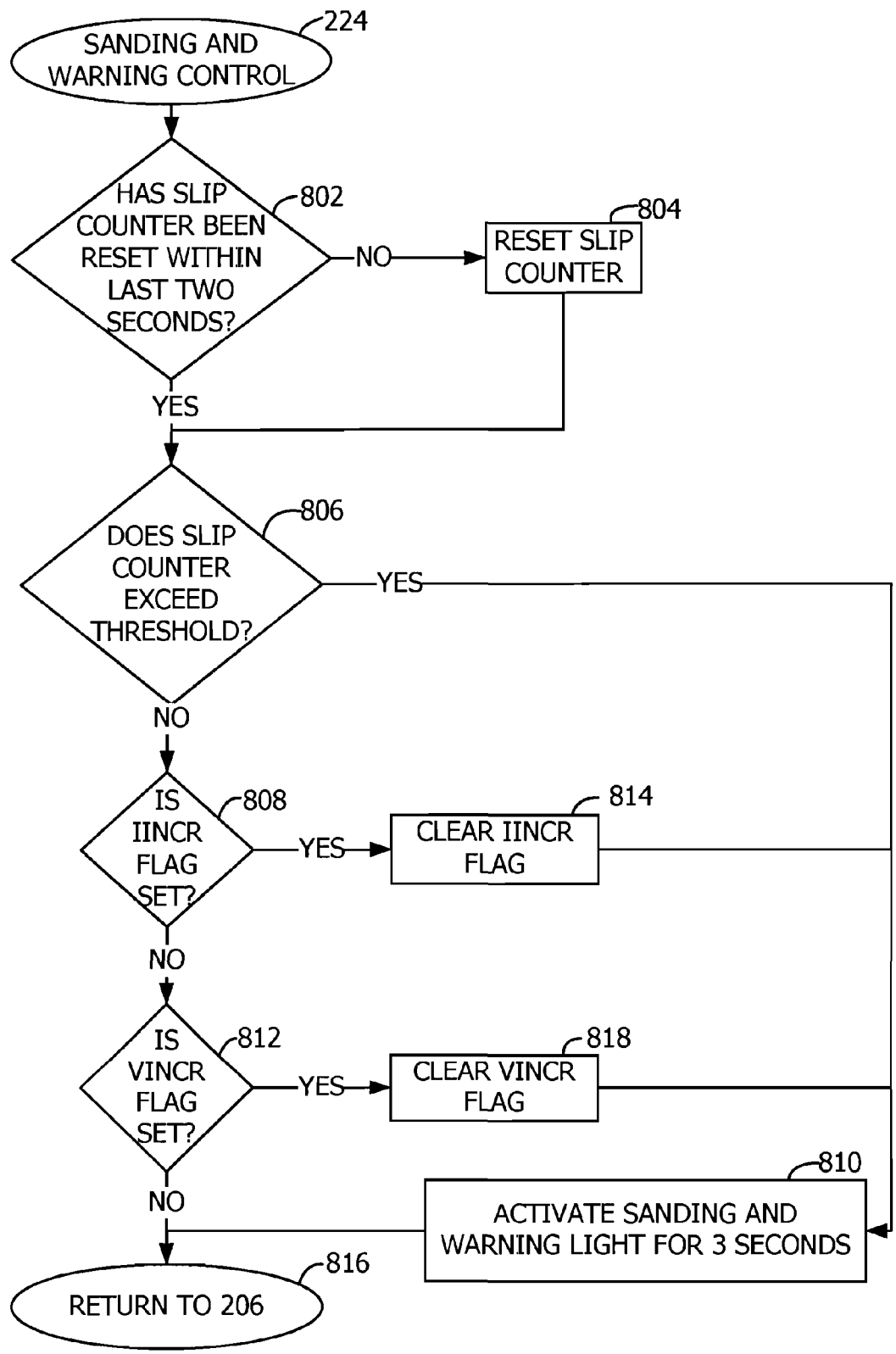

ADHESION CONTROL SYSTEM FOR OFF-HIGHWAY VEHICLE

BACKGROUND

In order to improve performance of an off-highway vehicle and in order to prevent damage to components of the off-highway vehicle (e.g., traction motors, choppers, and wheels) and a surface supporting the wheels (e.g., rails), loss of adhesion between wheels of the off-highway vehicle and the surface (i.e., wheel slip) is detected and corrected. Some off-highway vehicles use wheel speed sensors or traction motor revolutions per minute (rpm) sensors to determine adhesion loss by comparing the speed or rpm of each motor or wheel to one another.

Systems known in the art correct adhesion loss by reducing the output of the genset or energy source such that the power provided to all of the traction motors is reduced equally. This reduces the tractive effort of every wheel and the overall motive force provided by the vehicle. Other systems known in the art correct adhesion loss by completely shutting down the traction motor driving the slipping wheel for a predetermined period of time (e.g., 1 or 2 seconds). This allows the wheels that are not slipping to continue to provide their maximum tractive effort while eliminating wheel slip, however, it may unnecessarily reduce the tractive effort provided by the slipping wheel (i.e., over correct for the adhesion loss).

SUMMARY

Embodiments of the invention include methods for detecting adhesion loss and correcting adhesion loss. In one embodiment, the invention detects the presence and severity of wheel slip. The duty cycle of the traction motor driving the slipping wheel is reduced as a function of the severity of the wheel slip.

In another embodiment, the invention determines wheel slip by measuring a parameter of a traction motor and comparing the measured parameter to a running average of the measured parameter over a predetermined period of time. For example, the present voltage of a traction motor is compared to the average of the voltage of the traction motor over the previous 100 milliseconds to determine if a wheel driven by the traction motor is slipping and the severity of the slip.

In another embodiment, the invention determines wheel slip by measuring a parameter of a traction motor and comparing the measured parameter to the measured parameter from a predetermined period of time prior to the present time. For example, the present current of a traction motor is compared to the current of the traction motor from 10 milliseconds ago to determine if a wheel driven by the traction motor is slipping and the severity of the slip.

In another embodiment of the invention, both a current and voltage of a traction motor are measured and compared to various parameters to determine if a wheel driven by the traction motor is slipping and the severity of the slip. A duty cycle of the traction motor is modified as a function of the severity of the wheel slip. Additionally, a system wide adhesion loss detection (i.e., synchronous slip detection) and correction system is implemented in conjunction therewith to modify the duty cycle of all of the traction motors of the off-highway vehicle as a function of the severity of synchronous wheel slip.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 8 is a flow chart illustrating a sanding and warning control method compatible with the embodiment of the invention shown in FIG. 2.

Corresponding reference characters indicate corresponding parts throughout the drawings.

DETAILED DESCRIPTION

An off-highway vehicle has a basic configuration comprising an energy source, a controller, a sensor, a chopper, a traction motor, and wheels. An off-highway vehicle may have any number of these components as well as additional components. For example, one embodiment of an off-highway vehicle is a locomotive including a genset, a controller 102, sensors, choppers, traction motors, and wheels. The genset includes an engine and generator working in combination to provide electrical power to the vehicle. Each chopper pulse width modulates the power to a corresponding traction motor. Each traction motor converts the power to motive force and provides the motive force to an axle of the locomotive having a pair of wheels. The controller uses input from the sensors to control the amount of electrical power generated by the genset and the duty cycle of the pulse width modulated signal provided to each traction motor by its corresponding chopper. This example of an off-highway vehicle will be referenced hereafter, but one skilled in the art will recognize that the invention is applicable to other off-highway vehicle configurations. For example, each traction motor may drive a single wheel directly, or the energy source may be a plurality of batteries instead of, or in combination with one or more gensets.

Figure 1:
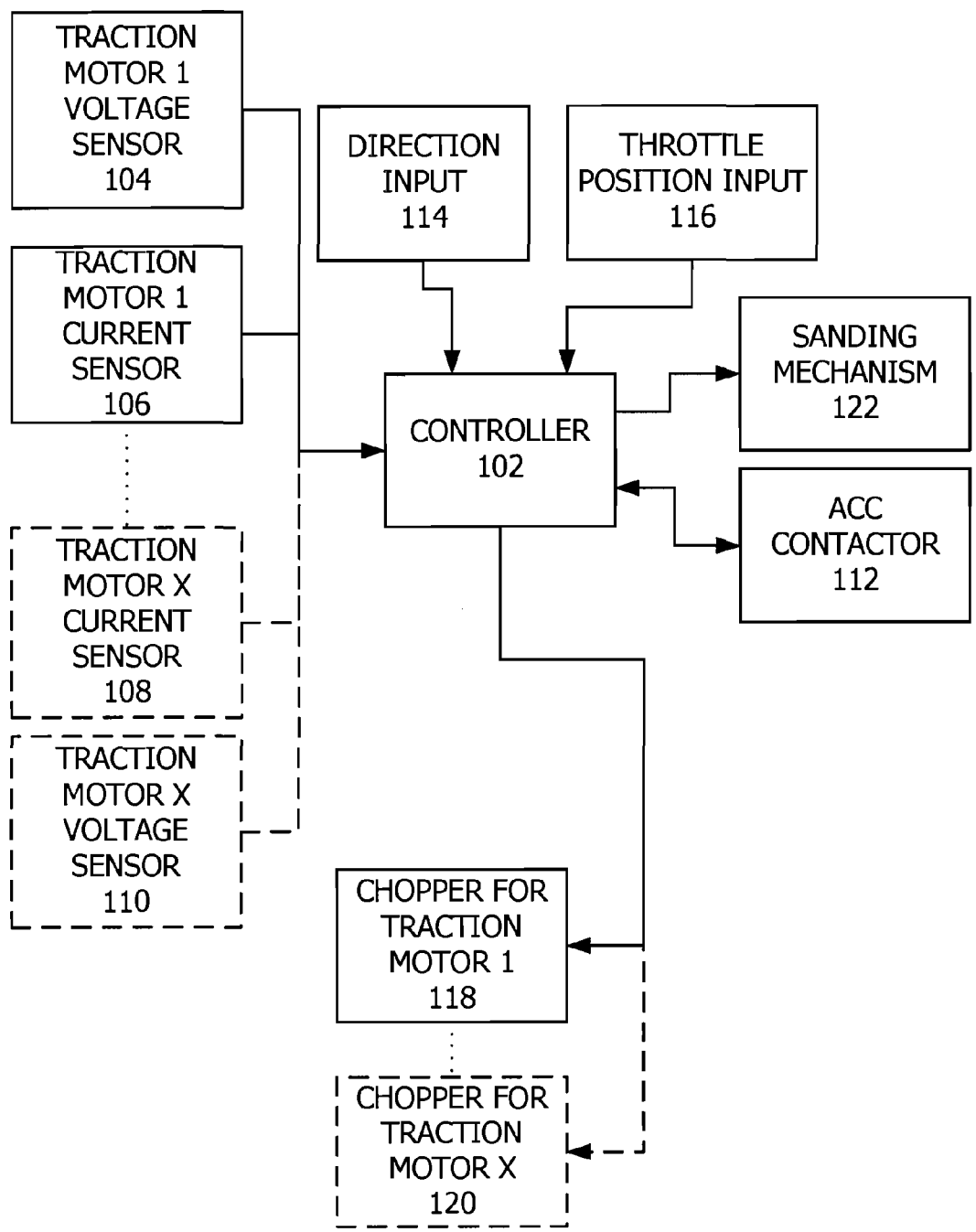
FIG. 1 is a block diagram of components of an adhesion loss detection and correction system according to one embodiment of the invention.

FIG. 1 is a block diagram illustrating an adhesion control system of an off-highway vehicle according to according to one embodiment of the invention. A controller 102 monitors sensors for determining adhesion loss. A traction motor of the off-highway vehicle has a corresponding voltage sensor 104 and current sensor 106. Each additional traction motor of the off-highway vehicle also has corresponding voltage and current sensors shown in ghost as voltage sensor 108 and current sensor 110. The controller 102 monitors an accessory contactor 112, directional input 114, an throttle position input 116 to determine when to begin controlling adhesion. The controller 102 independently determines the duty cycle of a first chopper 118 and additional choppers represented in ghost as chopper 120 based on input from the voltage and current sensors and the throttle position input 116. The controller 102 also activates the sanding mechanism 122 based on input from the voltage and current sensors. One embodiment of this process is explained in more detail in FIGS. 2-8.

Figure 2:
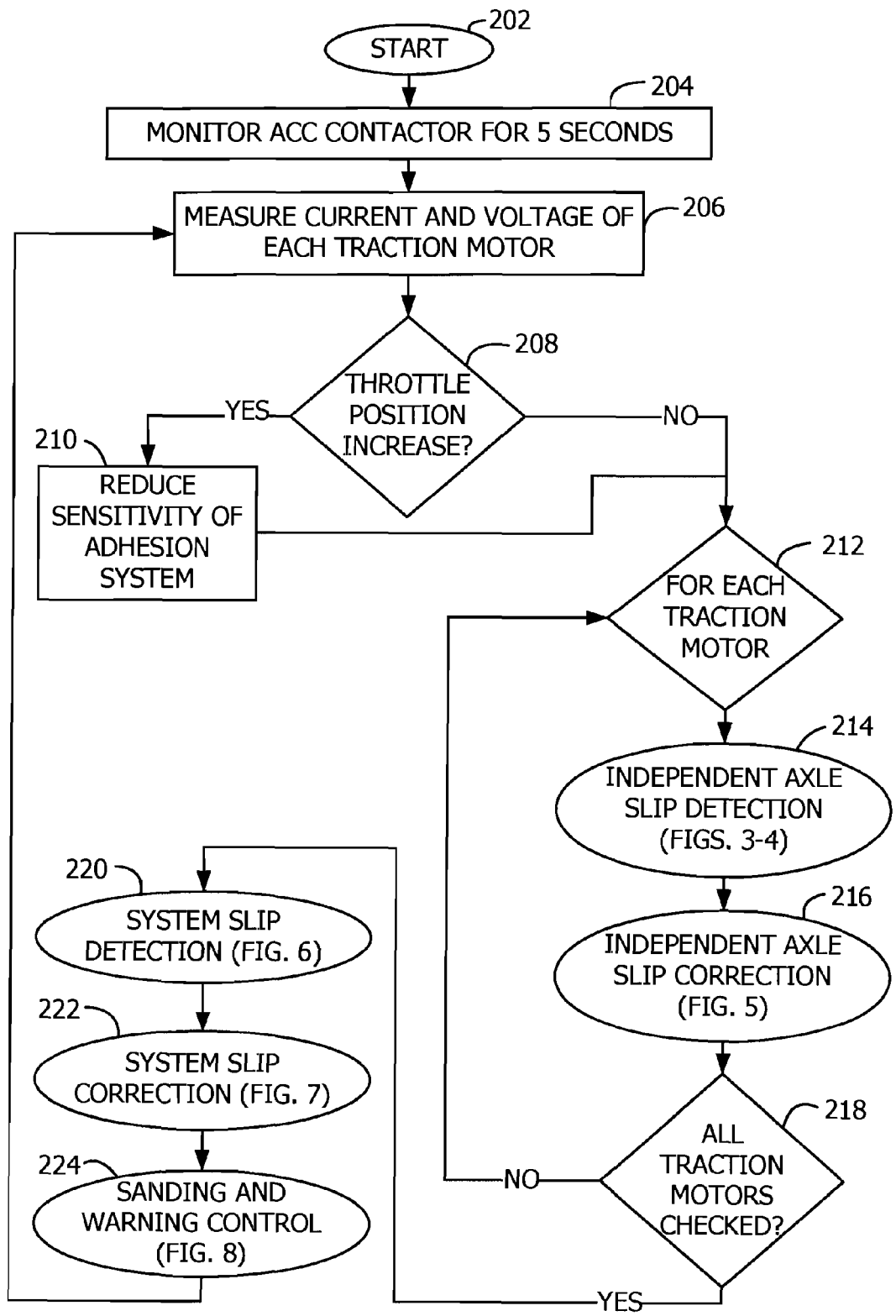
FIG. 2 is an exemplary flow chart illustrating an overview of an adhesion loss detection and correction method according to one embodiment of the invention.

FIG. 2 shows an overview of one embodiment of the invention of an adhesion control method according to which the system of FIG. 1 may operate. FIGS. 3-8 show various elements of FIG. 2 in more detail. Elements shown in the adhesion control system of FIGS. 2-8 can be rearranged, omitted, or added to without deviating from the scope of the present invention. The best combination and arrangement of elements of the invention depends on the configuration of the off-highway vehicle incorporating the invention. The embodiment of the invention shown FIGS. 2-8 illustrates some details that are applicable to a locomotive powered by multiple gensets having a traction bus and an accessory power bus. The amount of motive force to be provided by the locomotive is indicated by an operator via a throttle input device 116 having notches or positions. Four choppers each provide pulse width modulated signals to a corresponding traction motor. Each traction motor provides motive force to an axle having two wheels. Thus, the tractive effort or motive force of each axle of the locomotive can be independently adjusted by a controller 102 of the locomotive via the duty cycle of the traction motor driving the axle.

FIG. 2 is a flow diagram illustrating adhesion control according to one embodiment of the invention. The controller 102 begins operation at 202 and at 204, the accessory contactor 112 is activated and monitored for five seconds. The accessory contactor 112 provides power from a genset to the secondary power bus of the locomotive for systems including the controller 102, air conditioner, batteries for starting the gensets, cooling fans for the choppers and traction motors, and air compressors for the air brake system. The five second delay allows time for the engine of the genset to start up and stabilize. At 206, the controller 102 of the locomotive enters an adhesion control cycle by determining a parameter indicative of a voltage or current of each traction motor as indicated by sensors (e.g., voltage and current sensors 104, 106, 108, and 110) associated with each traction motor. At 208, the controller 102 determines whether the throttle position as indicated by the throttle position input 116 has changed within a predetermined period of time (e.g., 1 second). If the throttle position has been increased, then the sensitivity of the adhesion system is reduced for a predetermined period of time at 210. The sensitivity of the adhesion control system is reduced to allow for some adhesion variation between wheels of the locomotive to occur during acceleration of the locomotive (i.e., allow a predetermined amount of wheel creep).

At 212, the controller 102 executes an independent axle slip detection and correction loop for a first axle. At 214, sensor outputs indicating the measured current and voltage at the traction motor driving the first axle are analyzed by the controller 102 to determine if the wheels of the axle are slipping. (See FIGS. 3-4 for one embodiment of independent axle slip detection.) At 216, if the controller 102 determines that the wheels are slipping, the controller 102 modifies the duty cycle of the chopper 118 powering the traction motor driving the slipping wheels. The duty cycle is modified as a function of the sensed current and voltage of the traction motor. (See FIG. 5 for one embodiment of independent axle slip correction.) If all of the traction motors have not been analyzed for adhesion loss of their corresponding wheels, then the controller 102 returns to 212 and independent axle slip detection begins for the next axle at 214. This loop is repeated until all of the traction motors have been analyzed for adhesion loss and independent axle slip correction has been applied. At 218, if all of the traction motors have been analyzed for adhesion loss of their corresponding wheels, then at the controller 120 proceeds to 220 to begin system slip detection.

At 220, the controller 102 determines if there is system wide adhesion loss (i.e., synchronous wheel slip) and the severity of the synchronous wheel slip. That is, the controller 102 determines whether all of the wheels of the locomotive are slipping simultaneously. (See FIG. 6 for one embodiment of system slip detection.) At 222, the duty cycles of all of the traction motors of the locomotive are reduced as a function of the severity of the synchronous wheel slip if adhesion loss was detected at 220. (See FIG. 7 for one embodiment of system slip correction.) At 224, if a predetermined level of slip has been detected by either independent axle slip detection 214, or system slip detection 220, then the controller 120 activates the sanding mechanism 122 to apply sand to the rails and optionally warns the operator of the adhesion loss via a warning light or other alarm. (See FIG. 8 for one embodiment of a sanding and warning control system.) The controller 120 executes the adhesion detection and correction cycle again, beginning at 206 by measuring the voltage and current of each traction motor. The adhesion detection and correction cycle stops when the operator shuts down the locomotive.

Figure 3:
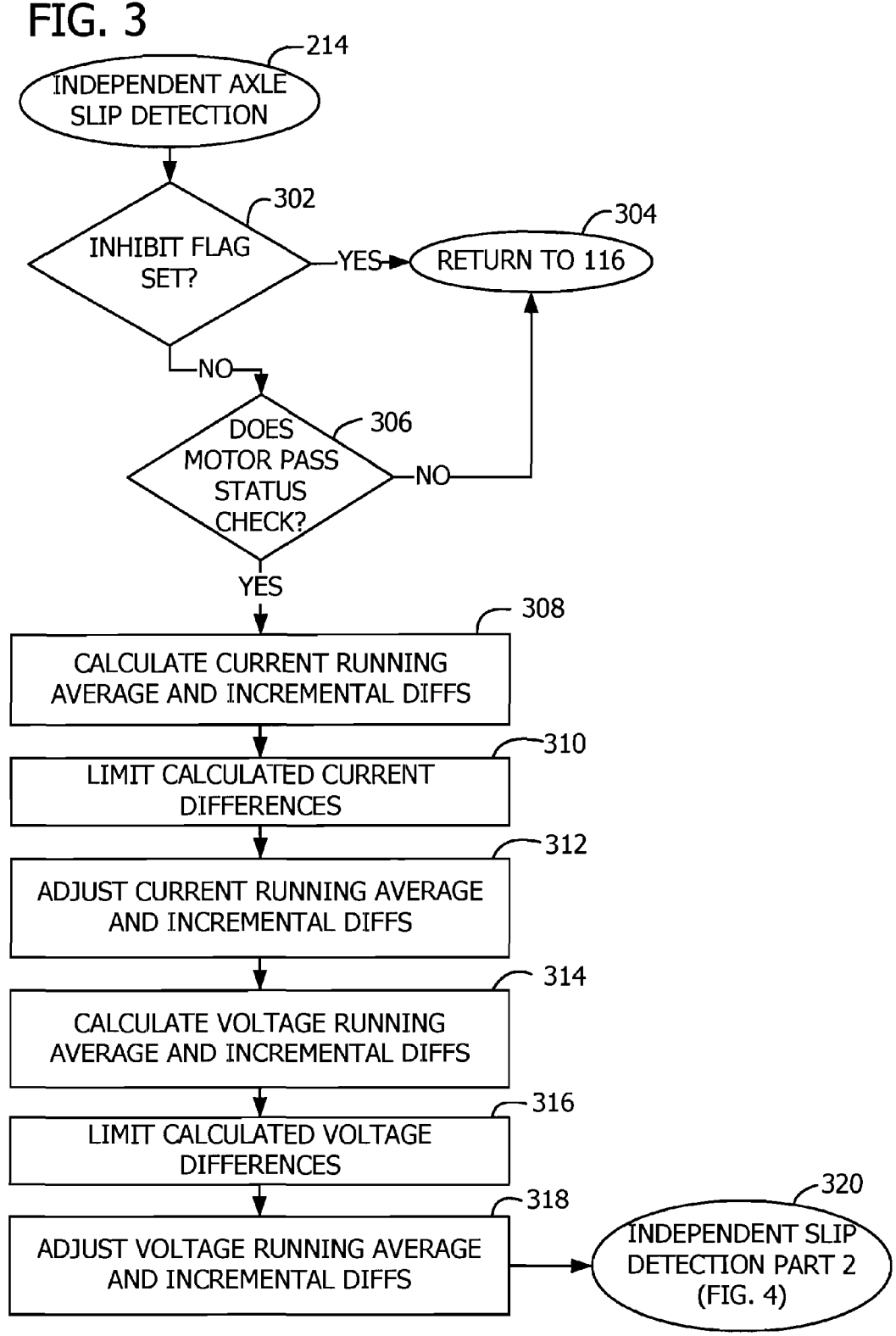
FIG. 3 is a flow chart illustrating the first part of an independent axle slip detection method compatible with the embodiment of the invention shown in FIG. 2.

Referring now to FIG. 3, the first of two parts (part two shown in FIG. 4) of an independent axle slip detection method (214 of FIG. 2) compatible with the embodiment of the invention shown in FIG. 2 is illustrated. The controller 102 begins independent axle slip detection at 214 and at 302, determines whether an inhibit flag has been set, or otherwise activated, by another system of the locomotive (i.e., a system other than the adhesion control system). Off-highway vehicle systems that may set the inhibit flag may include, for example, excitation and power control, ground relay control, traction motor regulation control, and insulated gate bipolar transistor (IGBT) chopper regulation control. These systems may inhibit the adhesion control system for any reason including preventing unnecessarily reducing tractive effort of the off-highway vehicle. If the inhibit flag has been set, then the adhesion control system is essentially shut down or otherwise bypassed while the inhibit flag remains set to prevent the locomotive from unnecessarily reducing motive force output. In one embodiment of the invention, the controller 102 steps through the procedure shown in FIG. 2, but no modification of the duty cycles of the traction motors is implemented in any of the slip detection or correction elements. At 302, if the inhibit flag is set, then the controller 102 moves on to independent axle slip correction 216 (see FIG. 2) at 304. If the inhibit flag is not set, then the controller 102 proceeds with independent axle slip detection by performing a status check on the traction motor at 306. The status check includes determining whether the traction motor is malfunctioning or overheated, and determining whether the chopper powering the traction motor is malfunctioning or overheated. If the traction motor should be taken out of service based on one or more of these determinations (i.e., fails the status check), then the controller 102 shuts down the chopper and traction motor and proceeds to independent axle slip correction 216 (see FIG. 2) at 304. The measured current and voltage of a shut down traction motor are not included in subsequent calculations (i.e., during independent slip correction 216, system slip detection 220, and system slip correction 222) so that the parameters of the traction motor measured at 206 do not affect the operation of the adhesion control system. If the traction motor and its corresponding chopper pass the status check, then the controller 102 proceeds with independent axle slip detection at 308 by analyzing the measured traction motor current.

At 308, the controller 102 calculates a current running average difference and a current incremental difference. The current running average difference is the difference between the present measured current of the traction motor and a running average of the current of the traction motor over a predetermined period of time prior to the present time (e.g., the last 100 ms). The current incremental difference is the difference between the present measured current of the traction motor and the current of the traction motor a set amount of time prior to the present time (e.g., the difference of the present current and the current 10 ms ago). These differences may be limited or capped at predetermined values at 310 to prevent an inaccurate or bad measurement from causing undesirable effects such as shutting down the traction motor unnecessarily during independent axle correction 216 (see FIG. 2). For example, the current differences may be limited to +/−500 Amperes. At 312, the controller 102 may adjust the current differences if the sensitivity of the adhesion control system has been reduced at 210 (see FIG. 2). For example, the current running average difference may be adjusted as indicated by the following computer pseudo-code:

$$IRUNAVG = \frac{IRUNAVG}{IMOD}$$

wherein IRUNAVG is the current running average and IMOD is a multiplier equal to 2 during normal operation and 1 when the adhesion control system is operating at a reduced sensitivity (see FIG. 2 at 210). Other adjustment schemes are contemplated. For example, the current differences may be multiplied by some factor or decreased by a predetermined amount. One skilled in the art will recognize that instead of calculating differences, the controller 102 may compare the current to the running average and prior current in another way such as determining a proportional or percentage change.

At 314, the controller 102 calculates a voltage running average difference and a voltage incremental difference. The voltage running average difference is the difference between the present voltage of the traction motor and the average of the voltage of the traction motor over a predetermined period of time prior to the present time (e.g., the last 100 ms). The voltage incremental difference is the difference between the present voltage of the traction motor and the voltage of the traction motor a set amount of time prior to the preset time (e.g., the difference of the present voltage and the voltage 10 ms ago). These voltage differences may be limited or capped at predetermined values at 316. For example, the voltage differences may be limited to +/−500 volts. At, 318, the controller may adjust the voltage differences if the sensitivity of the adhesion control system has been reduced at 210 (see FIG. 2). For example, the voltage running average difference may be adjusted as follows:

$$VRUNAVG = \frac{VRUNAVG}{VMOD}$$

wherein VRUNAVG is the voltage running average difference and VMOD is a multiplier equal to 4 during normal operation and 2 when the adhesion control system is operating at a reduced sensitivity (see FIG. 2 at 210). Other adjustment schemes are contemplated. For example, the voltage differences may be multiplied by some factor or decreased by a predetermined amount. At 320, the controller 102 begins the second part of independent slip detection.

Figure 4:
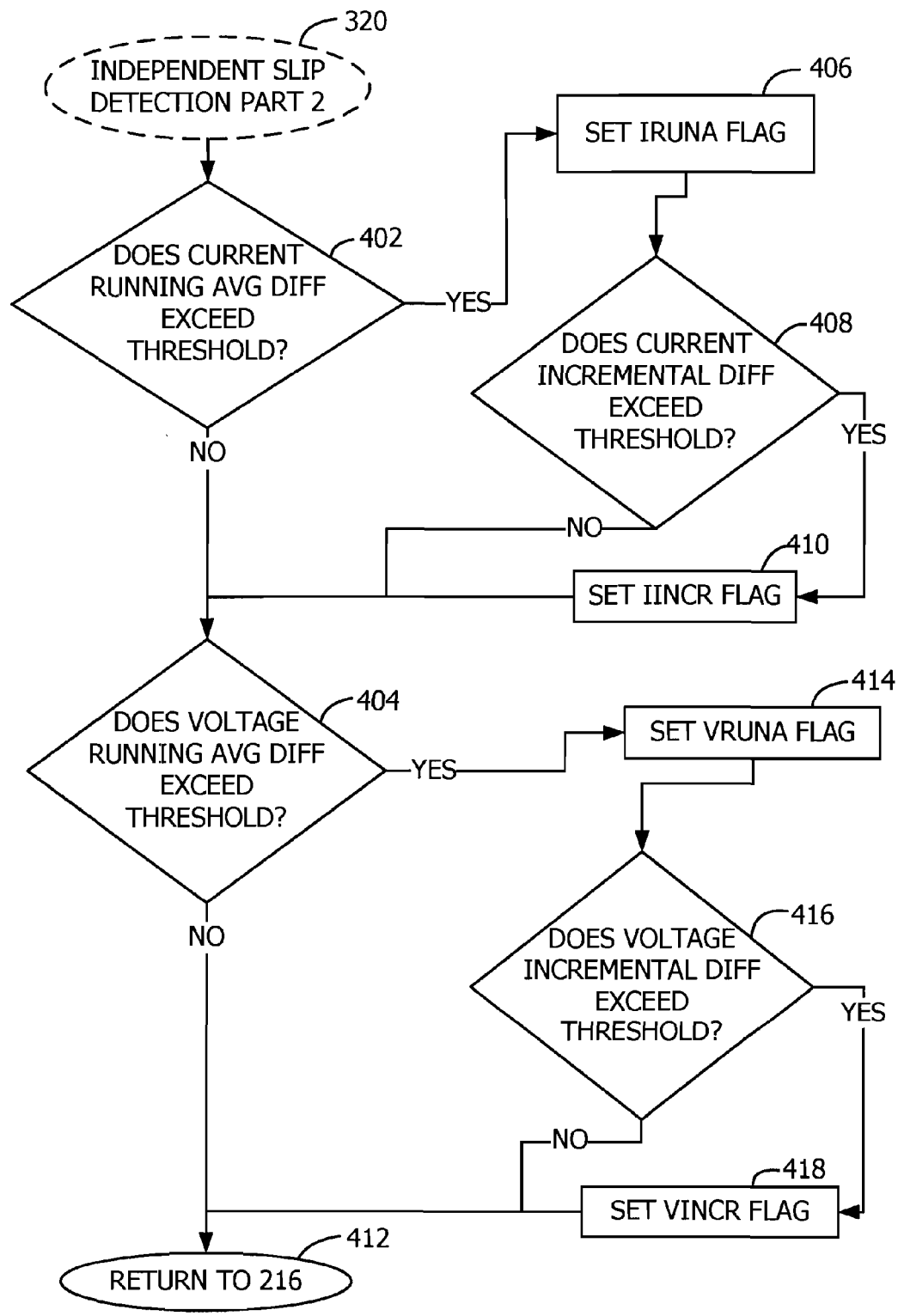
FIG. 4 is a flow chart illustrating the second part of an independent axle slip detection method compatible with the embodiment of the invention shown in FIG. 2.

Referring now to FIG. 4, the second part of independent slip detection (continued from FIG. 3) begins at 320. At 402, the controller 102 determines whether the current running average difference exceeds a corresponding threshold (e.g. 52 Amperes), and if it does not exceed the threshold, then at 404, the controller 102 moves on to analyzing the voltage running average difference at 404. If the current running average difference exceeds the threshold then, the controller 102 sets a flag corresponding to the current running average difference (i.e., an IRUNA flag) at 406, and compares the current incremental difference to a corresponding threshold (e.g., 50 Amperes) at 408. If the current incremental difference does not exceed the threshold, then the controller 102 moves on to analyzing the voltage running average difference at 404. If the current incremental difference exceeds the threshold, then at 20410, a flag corresponding to the current incremental difference (i.e., an IINCR flag) is set, and at 404, the voltage running average difference is analyzed.

In the illustrated embodiment of the invention, unless the controller 102 determines loss of adhesion from the analysis of the current running average difference at 402, the current incremental difference is not analyzed at 408 to further quantify the adhesion loss at the traction motor. Thus, analysis of the current incremental difference is staged from the analysis of the current running average difference. (Staging is where a secondary analysis is dependent on results of a primary analysis and only occurs when the primary analysis has a particular result.) The staging of one analysis from another allows the controller 102 to determine the severity of adhesion loss more accurately than without staging in some embodiments of the invention.

At 404, the controller 102 determines whether the voltage running average difference exceeds a corresponding threshold (e.g., 60 Volts). If the voltage running average difference does not exceed the threshold, then independent axle slip detection ends at 22412 by moving on to independent axle slip correction 216 (see FIG. 2). If the voltage running average difference exceeds the threshold, then the controller 102 sets a flag corresponding to the voltage running average difference (i.e., a VRUNA flag) at 414, and the voltage incremental difference is analyzed at 416. At 416, the controller 102 determines whether the voltage incremental difference exceeds a corresponding threshold (e.g., 80 Volts), and if it does not, independent axle slip detection ends at 22412 when the controller proceeds to independent axle slip correction 216 (see FIG. 2) at 412. If the voltage incremental difference exceeds the threshold, then at 418, the controller 102 sets a flag corresponding to the voltage incremental difference (i.e., a VINCR flag), and at 22412, the controller 102 moves on to independent axle slip correction 216 (see FIG. 2).

Figure 5:
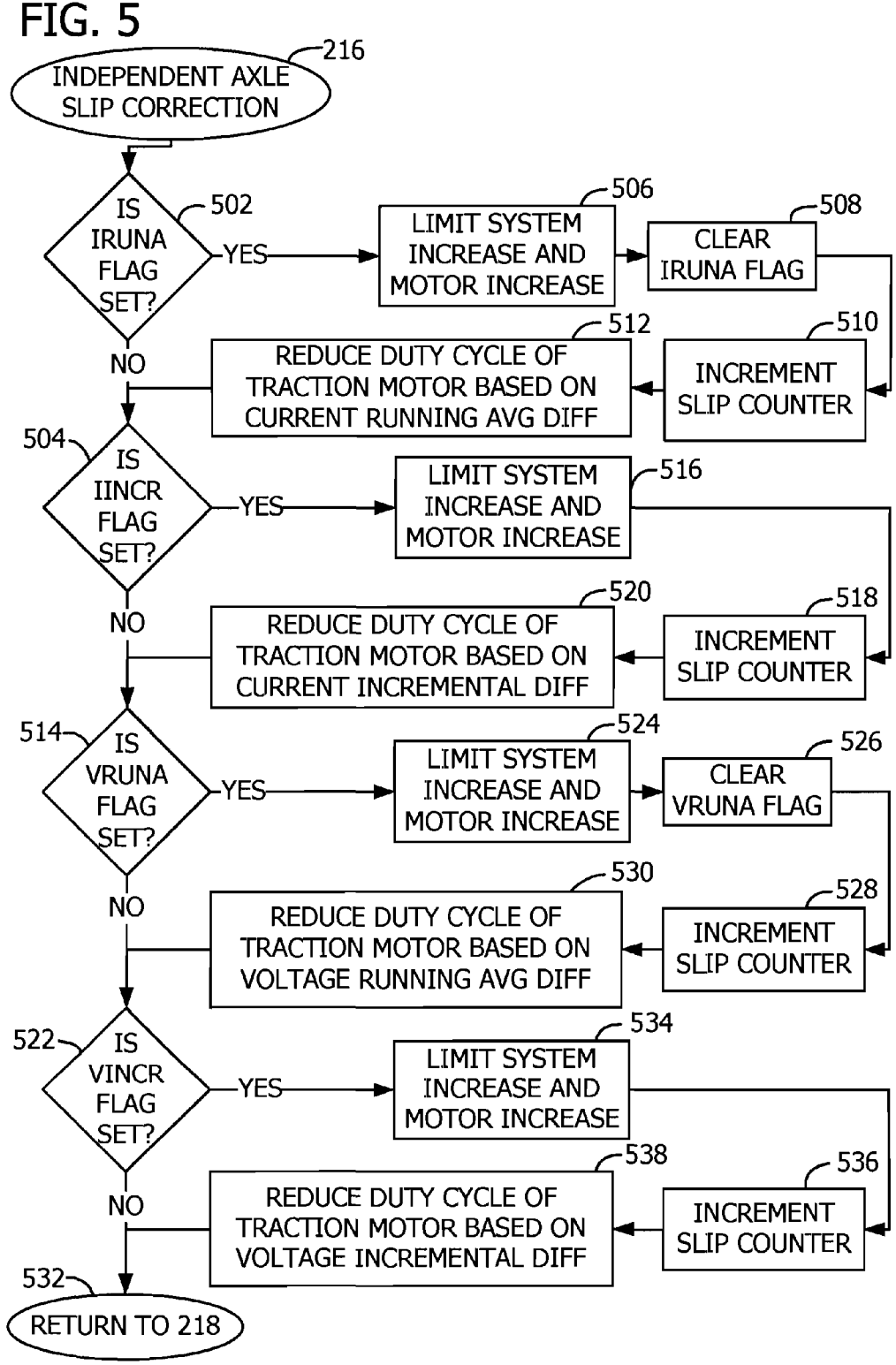
FIG. 5 is a flow chart illustrating an independent axle slip correction method compatible with the embodiment of the invention shown in FIG. 2.

Referring now to FIG. 5, one embodiment of a method for independent axle slip correction is shown. Although the illustrated embodiment checks each flag that may have been set in the independent axle slip detection stage 214 (see FIG. 2), one skilled in the art will recognized that if analysis is staged or dependent as shown in FIG. 4 and previously described, flag checking may be staged likewise (e.g., the IINCR flag is only checked if the IRUNA flag is set) to reduce the processing load on the controller 102. At 502, the controller 102 checks the IRUNA flag. If the flag is not set, then the controller 102 moves on to the IINCR flag at 504. If the IRUNA flag is set, then at 506, the controller 102 limits a system duty cycle increase rate and prevents duty cycle increases of the traction motor. The system increase rate is the rate at which a base line duty cycle increases. For example, the locomotive may increase its output of motive force by starting at a 5% duty cycle for each traction motor, and increasing that duty cycle by 5% per second. If, however, wheel slip is detected and the system increase rate is limited, then the locomotive increases the duty cycle at 1% per second while for a predetermined period of time or until some condition is met (e.g., 1 second or no wheel slip is detected at the traction motor). The duty cycle of the individual traction motor corresponding to the slipping wheel is prevented from increasing for a predetermined period of time, or until some condition is met (e.g., 1 second or no wheel slip is detected at the traction motor). At 508, the IRUNA flag is cleared, at 510 a slip counter is incremented, and at 512, the controller 102 modifies the duty cycle of the traction motor as a function of the current running average difference. For example, the duty cycle may be reduced as follows:

$$dutycycle = dutycycle \frac{(9999 - (IRUNAVG - IRUNTHRESH + IRUNAVG \cdot 5))}{10000}$$

wherein dutycycle is the duty cycle of the traction motor expressed as a percentage, IRUNAVG is the current running average difference, and IRUNTHRESH is the threshold corresponding to the current running average difference. The controller 102 then moves on to checking the IINCR flag at 504.

At 504, the controller 102 determines whether the IINCR flag is set. If the flag is not set, then the controller 102 moves on to the VRUNA flag at 514. If the IINCR flag is set, then the controller 102 limits the system duty cycle increase rate and prevents duty cycle increases of the traction motor at 516. These may be the same as the limitations imposed at 506, or, the system duty cycle increase rate may be further limited or reduced to zero. In some embodiments of the invention, the IINCR flag may be cleared, but in the illustrated embodiment of the invention, the IINCR flag remains set to be used later at sanding and warning control 224 (see FIG. 2). One skilled in the art may recognize that by not clearing the IINCR flag, it would remain set for each subsequent axle (or traction motor) until independent axle slip detection and correction 214 and 216 (see FIG. 2) is completed for each axle. This situation may be addressed in a number of ways including using a separate system flag for sanding and warning control or having a separate set of flags for each axle, which is the approach illustrated herein. At 518, the slip counter is incremented, and at 520, the controller 102 modifies the duty cycle of the traction motor, for example, as follows:

$$dutycycle = dutycycle \frac{(999 - (IINCRDIFF - IINCRTHRESH))}{1000}$$

wherein dutycycle is the duty cycle of the traction motor expressed as a percentage, IINCRDIFF is the current incremental difference, and IINCRTHRESH is the threshold corresponding to the current incremental difference. The controller 102 then moves on to checking the VRUNA flag at 514.

At 514, the controller 102 determines whether the VRUNA flag is set, and if it is not, the controller 102 proceeds to check the VINCR flag at 522. If the VRUNA flag is set, the controller 102 limits the system duty cycle increase rate and prevents duty cycle increases of the traction motor at 524, and clears the VRUNA flag at 526. The controller increments the slip counter at 528, and the duty cycle of the traction motor is modified at 530 as a function of the voltage running average difference, for example, as follows:

$$dutycycle = dutycycle \frac{(9999 - (VRUNAVG - VRUNTHRESH))}{10000}$$

wherein dutycycle is the duty cycle of the traction motor expressed as a percentage, VRUNAVG is the voltage running average difference, and VRUNTHRESH is the threshold corresponding to the voltage running average difference. The controller 102 then moves on to check the VINCR flag at 522.

At 522, the controller 102 determines whether the VINCR flag is set, and if the flag is not set, proceeds to the independent axle correction and detection loop at 218 (see FIG. 2). If the VINCR flag is set, then the controller 102 limits the system duty cycle increase rate and prevents duty cycle increases of the traction motor at 534, and increments the slip counter at 536. At 538, the controller 102 modifies the duty cycle of the traction motor as a function of the voltage incremental difference, for example, as follows:

$$dutycycle = dutycycle \frac{(999 - (VINCRDIFF - VINCRTHRESH))}{1000}$$

wherein dutycycle is the duty cycle of the slipping traction motor expressed as a percentage, VINCRDIFF is the voltage incremental difference, and VINCRTHRESH is the threshold corresponding to the voltage incremental difference. Independent axle slip correction ends at 532 by proceeding to the independent axle slip correction and detection loop at 218 (see FIG. 2).

Figure 6:
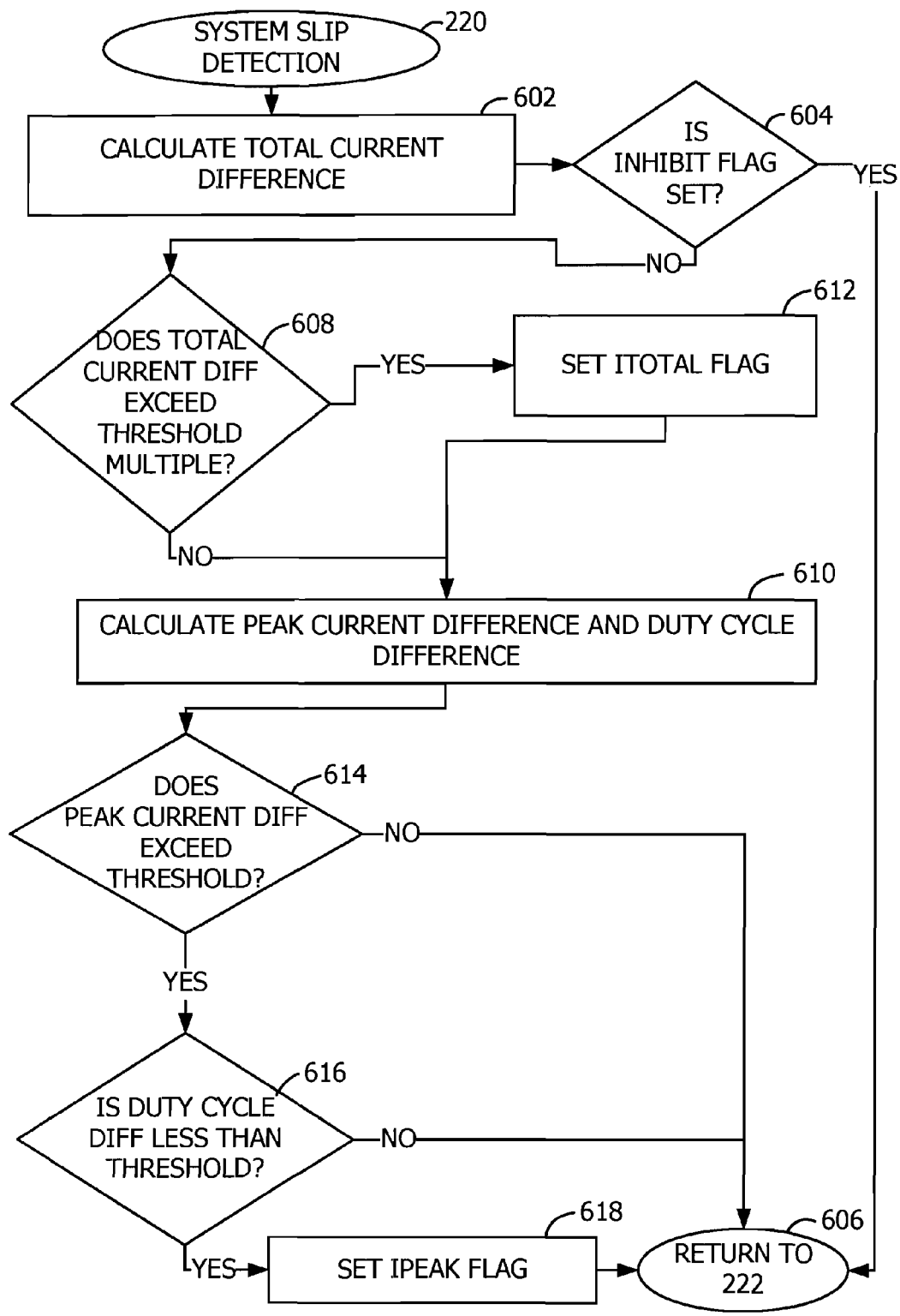
FIG. 6 is a flow chart illustrating a system slip detection method compatible with the embodiment of the invention shown in FIG. 2.

Referring now to FIG. 6, a method of system slip detection or synchronous wheel slip detection is illustrated according to one embodiment of the invention. System slip detection begins at 220 and the controller 102 calculates a total current difference at 602. The total current difference is the difference between the average of the present measured current of all traction motors (that passed the status check at 306, see FIG. 3) and the average of the current of all of the traction motors (that passed the status check at 306) from a predetermined amount of time prior to the present time. For example, the total current difference is the difference between the average of the present measured current of the traction motors and the average of the current of the traction motors 100 ms ago. At 604, the controller 102 checks to see whether the inhibit flag has been set by another system of the locomotive (as described above with respect to independent slip detection 214 at 302), and if it has, system slip detection ends at 606 by proceeding to system slip correction at 222 (see FIG. 2). If the inhibit flag has not been set, then at 608, the controller 102 determines whether the total current difference exceeds a multiple of a corresponding threshold (e.g., 15 Amperes). The multiple may be constant or adjustable as a function of reducing the sensitivity of the adhesion control system at 210 (see FIG. 2). For example, the multiple may be 2 during normal operation and 1 when operating at a reduced sensitivity. If the total current difference exceeds the multiple of the threshold, then the controller 102 sets a corresponding flag (i.e., an ITOTAL flag) at 612.

At 614, the controller 102 calculates a peak current difference and a duty cycle difference. The peak current difference is the difference between the measured current of the traction motor having the lowest measured current (that passed the status check at 306) and the measured current of the traction motor having the highest measured current (that passed the status check at 306). The duty cycle difference is the difference (expressed as a percentage) between the duty cycle of the traction motor having the lowest measured current (that passed the status check at 306) and the duty cycle of the traction motor having the highest measured current (that passed the status check at 306). At 614, the controller 102 determines whether the peak current difference exceeds a corresponding threshold (e.g., 250 Amperes), and if it does not, system slip detection ends at 606 by moving on to system slip correction at 222 (see FIG. 2). If the peak current difference does exceed the threshold, then at 616, the controller 102 determines whether the duty cycle difference is less than a corresponding minimum threshold (e.g., 30%). If the duty cycle difference is not less than the threshold, then the controller 102 moves on to system slip correction 222 (see FIG. 2) at 606. If the duty cycle difference is less than the threshold, then at 618, the controller 102 sets a corresponding flag (i.e., an IPEAK flag), and at 606, the controller 102 moves on to system slip correction 222 (see FIG. 2) at 606.

Figure 7:
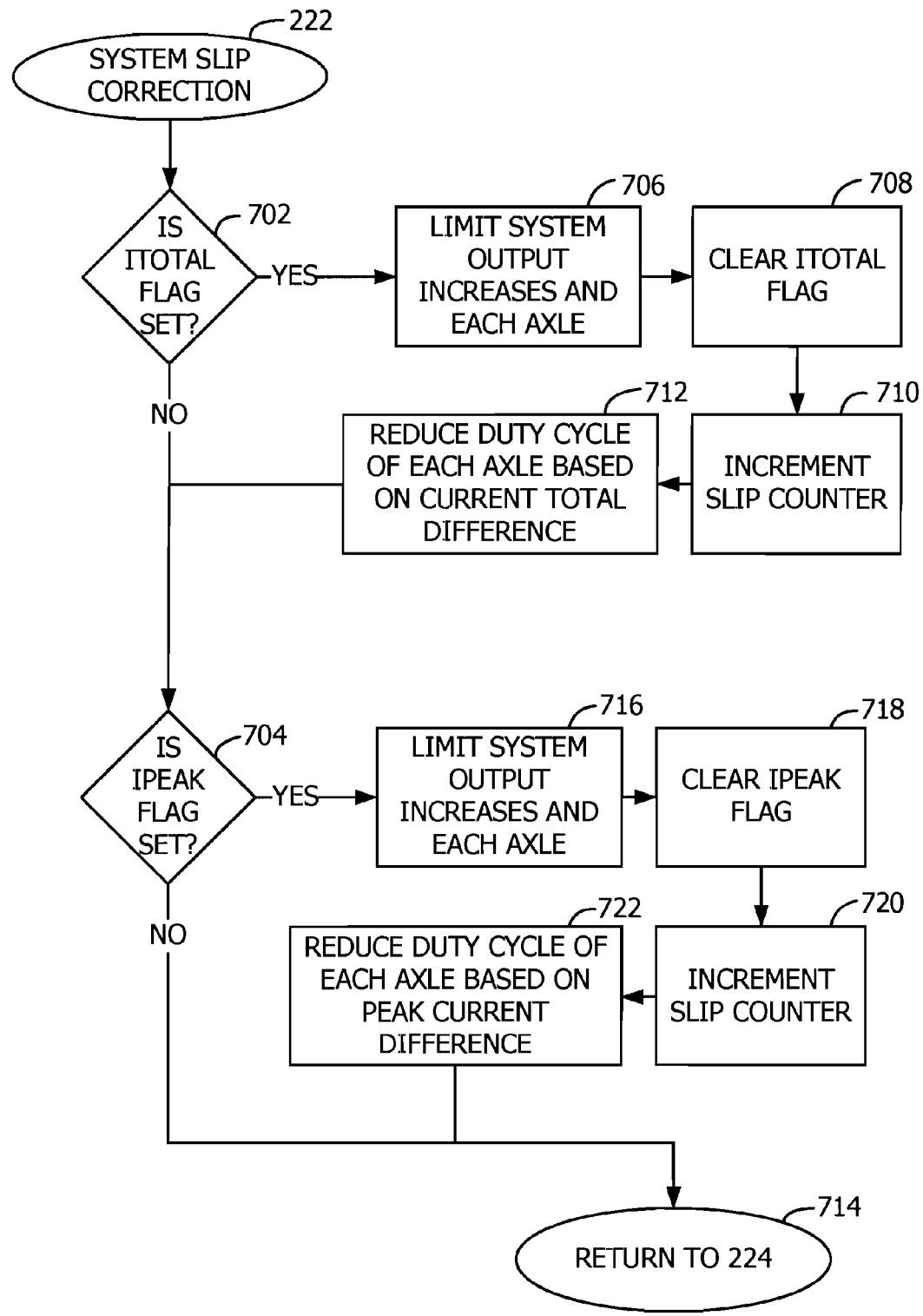
FIG. 7 is a flow chart illustrating a system slip correction method compatible with the embodiment of the invention shown in FIG. 2.

Referring now to FIG. 7, a system slip correction method according to one embodiment of the invention is illustrated. The controller begins system slip correction begins at 222 and determines whether the ITOTAL flag is set at 702. If the ITOTAL flag is not set, then the controller 102 checks the IPEAK flag at 704. If the ITOTAL flag is set, then at 706, the controller 102 limits the system duty cycle increase rate and prevents duty cycle increases of all of the traction motors for a predetermined period of time or until a condition is met (e.g., 1 second or no slip is detected at any traction motor). At 708, the ITOTAL flag is cleared and at 710, the slip counter is incremented. At 712, the controller 102 modifies the duty cycle of each traction motor as a function of the total current difference. For example, the duty cycle of each traction motor is modified as follows:

$$dutycycle = dutycycle \frac{(9999 - (TOTIDIFF - TOTITHRESH))}{10000}$$

wherein dutycycle is the duty cycle of each traction motor expressed as a percentage, TOTIDIFF is the total current difference, and TOTITHRESH is the threshold corresponding to the total current difference. The controller 102 then moves on to check the IPEAK flag at 704.

At 704, the controller 102 determines whether the IPEAK flag is set, and if it is not, then system slip correction ends at 714 by moving on to sanding and warning control at 224 (see FIG. 2). If the IPEAK flag is set, then at 716, the controller 102 limits the system duty cycle increase rate and prevents duty cycle increases of all of the traction motors for a predetermined period of time or until a condition is met (e.g., 1 second or until no slip is detected at any motor). At 718, the IPEAK flag is cleared, and at 720, the slip counter is incremented. At 722, the controller 102 modifies the duty cycle of each traction motor as a function of the peak current difference. For example, the duty cycle of each traction motor is modified as follows:

$$dutycycle = dutycycle \frac{(9999 - (IPEAKDIFF - IPEAKTHRESH))}{10000}$$

wherein dutycycle is the duty cycle of each traction motor expressed as a percentage, IPEAKDIFF is the peak current difference, and IPEAKTHRESH is the threshold corresponding to the peak current difference. At 714, the controller 102 ends system slip correction by moving on to sanding and warning control 224 (see FIG. 2).

Referring now to FIG. 8, a sanding and warning control method is illustrated according to one embodiment of the invention. The controller begins sanding and warning control at 224, and determines whether the slip counter has been reset within the last two seconds at 802. If it has not, then at 804, the slip counter is reset to zero, and at 806, the controller 102 determines whether the slip counter exceeds a corresponding threshold. If the slip counter does not exceed the threshold at 806, then at 808, the controller 102 checks the IINCR flags. If the slip counter does exceed the threshold, then at 20810, the controller 102 activates a sanding mechanism and warning light for a predetermined period of time (e.g., 3 seconds), and the sanding and warning control ends at 816 when the adhesion control cycle restarts by measuring the current and voltage of each traction motor at 206 (see FIG. 2).

One skilled in the art will recognize that other implementations of a slip counter are possible. For example, instead of resetting arbitrarily every two seconds, the slip counter may be a running total of events which would cause the slip counter to increment during a predetermined period of time prior to the present time, or may be reset upon the occurrence of a condition (e.g., no flags indicating slip set within a predetermined period of time prior to the present).

If the slip counter does not exceed the threshold at 806, then at 808, the controller 102 determines whether an IINCR flag is set. If no IINCR flag is set, then the controller 102 goes on to check the VINCR flags at 812. If an IINCR flag is set, then at 814 the controller 102 clears the IINCR flags and activates the sanding mechanism and warning light for a predetermined period of time (e.g., 3 seconds) at 810.

If no IINCR flag was determined to be set at 808, then at 812, the controller 102 determines whether any VINCR flag is set. If no VINCR flag is set, then sanding and warning control ends at 816 by restarting the adhesion control cycle by measuring the current and voltage of the traction motors at 206 (see FIG. 2). If a VINCR flag is set, then the controller 102 clears the VINCR flags at 718 and activates the sanding mechanism and warning light for a predetermined period of time (e.g., 3 seconds) at 810. Sanding and warning control ends at 816 when the adhesion control cycle restarts by measuring the voltage and current of the traction motors at 206 (see FIG. 2).

The controller 102 described herein for executing instructions embodying methods of the present invention may be a computer, a dedicated computing device, a network of computing devices, or any other similar device.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for controlling adhesion of a wheel driven by a traction motor of an off-highway vehicle, wherein the traction motor is driven by an electrical signal which is pulse width modulated at a duty cycle, said method comprising:
    measuring a parameter over a predetermined amount of time indicative of a current or voltage of the electrical signal;
    determining a running average based on said measuring of the parameter over the predetermined period of time;
    comparing the measured parameter at the present time to the running average of the measured parameter over the predetermined period of time wherein the comparison is indicative of changes in wheel adhesion; and
    modifying the duty cycle of the electrical signal as a function of the comparing to maximize wheel adhesion.

2. The method of claim 1 when the comparison indicates that the measured parameter at the present time is less than the running average indicating wheel slip, then the rate of change of the duty cycle of the electrical signal is decreased to minimize wheel slip.

3. The method of claim 1 wherein modifying further comprises:
    modifying the duty cycle of the electrical signal as a function of the comparing if the difference between the measured parameter at the present time and the running average exceeds a threshold.

4. The method of claim 3 wherein:
    measuring a parameter comprises measuring a current of the electrical signal; and
    comparing comprises determining a difference.

5. The method of claim 3 wherein:
    measuring a parameter comprises measuring a voltage of the electrical signal; and
    comparing comprises determining a difference.

6. The method of claim 1 further comprising:
    adjusting the comparison if a throttle change has been registered within a second predetermined period of time.

7. The method of claim 1 wherein modifying comprises:
    modifying the duty cycle of the electrical signal as a function of the comparing and as a function of the measured parameter at the present time compared to a threshold;
    controlling a rate of change as a function of the comparing; and
    inhibiting the duty cycle of the electrical signal from changing for a second predetermined period of time.

8. The method of claim 1 wherein the duty cycle of the electrical signal is not modified unless the comparing indicates a difference between the parameter and the running averages exceeds a threshold.

9. The method of claim 1 wherein the off-highway vehicle has a plurality of traction motors, each driven by an electrical signal, each motor driving an associated wheel, said method further comprising:
    measuring a current of each of the electrical signals;
    determining a total current difference between an average total current of the electrical signals and a total average current of the electrical signals from a predetermined amount of time prior to the present time;
    determining a peak current difference between the measured current of the electrical signal having the highest measured current and the measured current of the electrical signal having the lowest measured current;
    determining a duty cycle difference between the duty cycle of the electrical signal having the highest measured current and the duty cycle of the electrical signal having the lowest measured current; and
    modifying the duty cycles of the plurality of electrical signals as a function of the determined total current difference, the peak current difference, and duty cycle difference.

10. The method of claim 1 modifying comprises limiting the rate of increase of the duty cycle or the rate of decrease of the duty cycle.

11. The method of claim 1 further comprising:
    sanding a rail along which the off-highway vehicle travels as a function of the comparing; and
    activating a slip warning light of the off-highway vehicle as a function of the comparing.

12. The method of claim 1 wherein:
    the off-highway vehicle has an additional system for controlling an aspect of the off-highway vehicle; and
    the modifying is inhibited if an inhibit flag is indicated by the additional system.

13. The method of claim 1 further comprising:
    measuring an additional parameter indicative of a current or voltage of the electrical signal;
    comparing the measured additional parameter to a running average of the additional measured parameter over a predetermined period of time; and
    modifying the duty cycle of the electrical signal as a function of the comparing the measured additional parameter to the running average of the additional parameter.

14. The method of claim 13 wherein the parameter is a voltage of the electrical signal and the additional parameter is a current of the electrical signal.

15. The method of claim 13 wherein the additional parameter is a voltage of the electrical signal.

16. A method for controlling adhesion of a wheel driven by a traction motor of an off-highway vehicle, wherein the traction motor is driven by an electrical signal which is pulse width modulated at a duty cycle, said method comprising:

measuring a parameter indicative of a current or voltage of the electrical signal;

comparing the measured parameter and the measured parameter from a predetermined amount of time prior to the present time;

modifying the duty cycle of the electrical signal as a function of the comparing;

measuring an additional parameter indicative of a current or voltage of the electrical signal;

comparing the additional measured parameter and a running average of the additional measured parameter over a predetermined period of time; and modifying the duty cycle of the electrical signal as a function of the comparing the additional measured parameter and the running average of the additional measured parameter.

17. The method of claim 16 wherein:

measuring a parameter comprises measuring a voltage of the electrical signal;

comparing comprises determining a voltage difference between the measured voltage and the measured current from a predetermined amount of time prior to the present time; and modifying the duty cycle of the electrical signal comprises modifying the duty cycle of the electrical signal as a function of the determined voltage difference.

18. The method of claim 16 wherein:

measuring a parameter comprises measuring a current of the electrical signal;

comparing comprises determining a current difference between the measured current and the measured current from a predetermined amount of time prior to the present time; and modifying the duty cycle of the electrical signal comprises modifying the duty cycle of the electrical signal as a function of the determined current difference.

19. A system for controlling adhesion of a wheel driven by a traction motor of an off-highway vehicle wherein the fraction motor is driven by an electrical signal, said system comprising:

a controller for pulse width modulating the electrical signal at a duty cycle, and sensor measuring a parameter corresponding to a current or voltage of the electrical signal, said sensor providing a parameter signal to the controller indicative of the measured parameter;

wherein the controller determines a running average of the measured parameter as indicated by the parameter signal over a predetermined period of time and wherein the controller compares the measured parameter at the present time as indicated by the parameter signal at the present time and the determined running average wherein the comparison is indicative of changes in wheel adhesion; and wherein the controller modifies the duty cycle of the electrical signal as a function of the comparison to maximize wheel adhesion.

20. The method of claim 19 when the comparison by the controller indicates that the measured parameter at the present time is less than the running average indicating wheel slip, then the controller decreases the rate of change of the duty cycle of the electrical signal to minimize wheel slip.

* * * * *